United States Patent [19]

Cremer

[11] 3,999,247
[45] Dec. 28, 1976

[54] VEHICLE SEAT FITTING

[76] Inventor: Heinz P. Cremer, Hans-Bockler-Str. 10, 563 Remscheid-Luttringhausen, Germany

[22] Filed: Dec. 31, 1974

[21] Appl. No.: 537,786

[52] U.S. Cl. .................................. 16/146; 297/369
[51] Int. Cl.² ....................................... E05D 11/10
[58] Field of Search ............ 16/139, 140, 146, 141, 16/147, 138, 144; 74/530, 536; 297/367, 373, 353, 354, 362, 366, 371, 372, 364, 369

[56] References Cited

UNITED STATES PATENTS

| | | | |
|---|---|---|---|
| 3,315,298 | 4/1967 | Strich et al. | 16/146 |
| 3,432,881 | 3/1969 | Putsch et al. | 16/146 |
| 3,608,128 | 9/1971 | Faust | 16/146 |
| 3,833,965 | 9/1974 | Hess | 16/146 |

Primary Examiner—G. V. Larkin

[57] ABSTRACT

A fitting for a vehicle seat having a tiltable backrest member includes one hinge member that is connectable to the backrest member and another hinge member that is connectable to the backrest member. A pivot arrangement connects the hinge members for relative pivoting movement, and an arresting arrangement is provided for arresting the hinge members in selected relative angular positions. The arresting arrangement includes a tubular boss on at least one of the hinge members and a pawl that is journalled on the boss for turning movement about the same. A screw or bolt extends through the boss and connects the hinge member to the associated seat member or backrest member.

7 Claims, 4 Drawing Figures

VEHICLE SEAT FITTING

BACKGROUND OF THE INVENTION

The present invention relates to vehicle seats in general, and more particularly to the type of vehicle seats wherein the backrest member can be raised or lowered.

Still more particularly, the invention relates to a hinge fitting for connecting the backrest member and the seat member of a vehicle seat of the type in question.

Vehicle seats of this type are well known and are, for example, widely used in automobiles. It is conventional to provide them with two hinge members, one of which is secured to the backrest member of the seat and the other of which is secured to the seat member. As a rule, these hinge members are each mounted on the backrest member or seat member, respectively, by means of at least two screws. However, rather large portions of these hinge members are covered by the components that are required to adjust the angular positions of the hinge members relative to one another, such as handles or the like, and are therefore not accessible for mounting or dismounting of the screws. This means that the hinge members must be made larger than would otherwise be necessary, in order to have some free hinge member area available where the screws can be mounted. This is evidently disadvantageous, not only because more material is required than would be the case if it were not for these considerations, but also because there is often simply not sufficient room on the seat member and the backrest member to mount such enlarged hinge members.

SUMMARY OF THE INVENTION

It is a general object of the invention to overcome the disdvantages of the prior art.

More particularly, it is an object of the present invention to provide a vehicle seat fitting of the type in question which is so constructed that its hinge members can be smaller than was previously possible, but nevertheless permit proper mounting and demounting without difficulties.

Another object of the invention is to provide such a fitting in which the hinge members can also be made of lesser thickness than was previously the case without, however, thereby in any way deleteriously influencing their strength and resistance to deformation.

In keeping with these objects, and with others which will become apparent hereafter, one feature of the invention resides in a hinge fitting for vehicle seats having a tiltable backrest member, which comprises a first hinge member connectable to a seat rest member, a second hinge member connectable to a backrest member, and pivot means connecting the hinge members for relative pivoting movement. Arresting means is provided for arresting the hinge members in selected relative angular positions; this arresting means includes a tubular boss on at least one of the hinge members and a pawl journalled on the boss for turning movement about the same. Connecting means extends through the boss and connects the one hinge member having the boss to the associated seat member or backrest member, as the case may be.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 3 is a section on line III—III of FIG. 2; and

FIG. 4 is a section on line IV—IV of FIG. 2.

DESCRIPTION OF THE PREFERRED EMBODIMENTS

Figure 1:
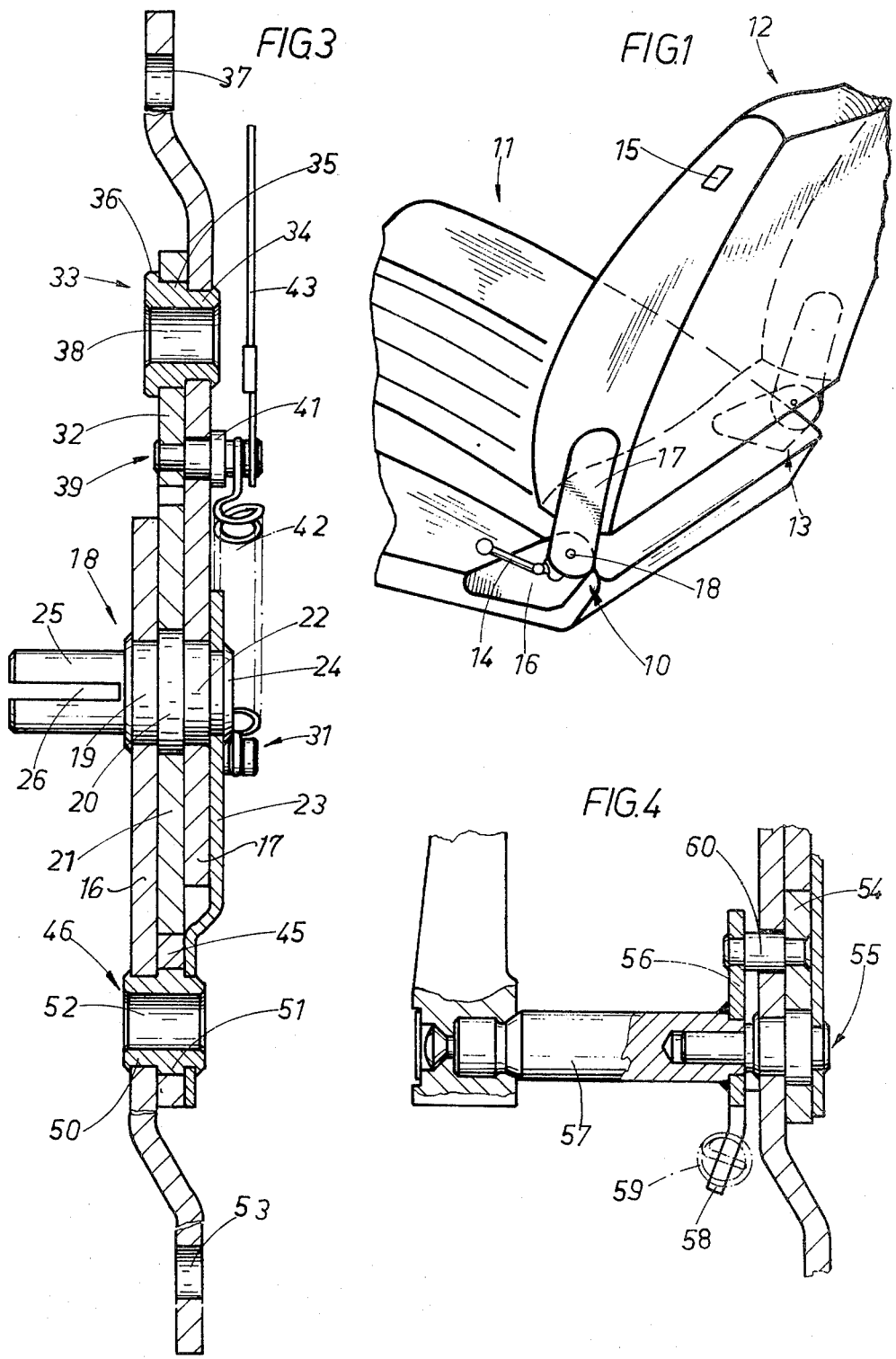
FIG. 1 is a perspective view illustrating a vehicle seat provided with the hinge fitting of the invention.

Discussing the drawing in detail, and referring firstly to FIG. 1, it will be seen that this Figure shows a seat having a seat member 11 and a backrest member 12. The backrest member 12 is connected with the seat member 11 by means of a hinge fitting 10 according to the present invention, so that the backrest member 12 can be tilted to a plurality of inclined positions relative to the seat member 11. The fitting 10 according to the present invention need be provided at only one side of the seat, for example the left side, whereas a further fitting 13 may be located at the right side and connect the members 11 and 12; this may simply be a pivotable hinge without arresting means. Of course, two of the arrestable fittings 10 could also be provided if desired, and would then be coupled with one another in a manner that forms no part of the invention, so that when one of them is operated to engage or disengage its arresting means, the arresting means of the other fitting would be simultaneously and similarly operated.

The hinge 10 is provided, as FIG. 1 shows more clearly, with a handle 14 that must be operated to arrest the seat back member 12 in its selected position relative to the seat member 11, and a further element 15 that must be operated to permit the pivoting of the backrest member 12. Basically, the fitting 10 comprises a fitting member 16 which is fixedly connected with the seat member 11 and a fitting member 17 which is fixedly connected with the backrest member 12. The members 16 and 17 are pivotally connected by means of a pivot pin 18. A portion 19 of the pin 18 is mounted in the member 16 against axial and rotational displacement. A cylindrical portion 20 adjacent the portion 19 carries an annular member 21 that can turn. A stepped portion 22 of the pin 18 rotatably mounts the member 17 which is straddled by a supporting member 23 one end of which is connected to the member 16 and which is also connected to the free end of the pin 18 by means of a rivet 24. FIG. 3 shows that the pin 18 has at the left side a portion 25 formed with a longitudinal slot 26 and serving to retain the inner end of a flat spiral spring S which is prestressed in order to pivot the member 21 relative to the member 16 in counterclockwise (in FIG. 2) direction in order to facilitate the selection of the inclination of the seat back member 12. The spiral spring engages with its outer end a projection 27 of the member 21.

Figure 2:
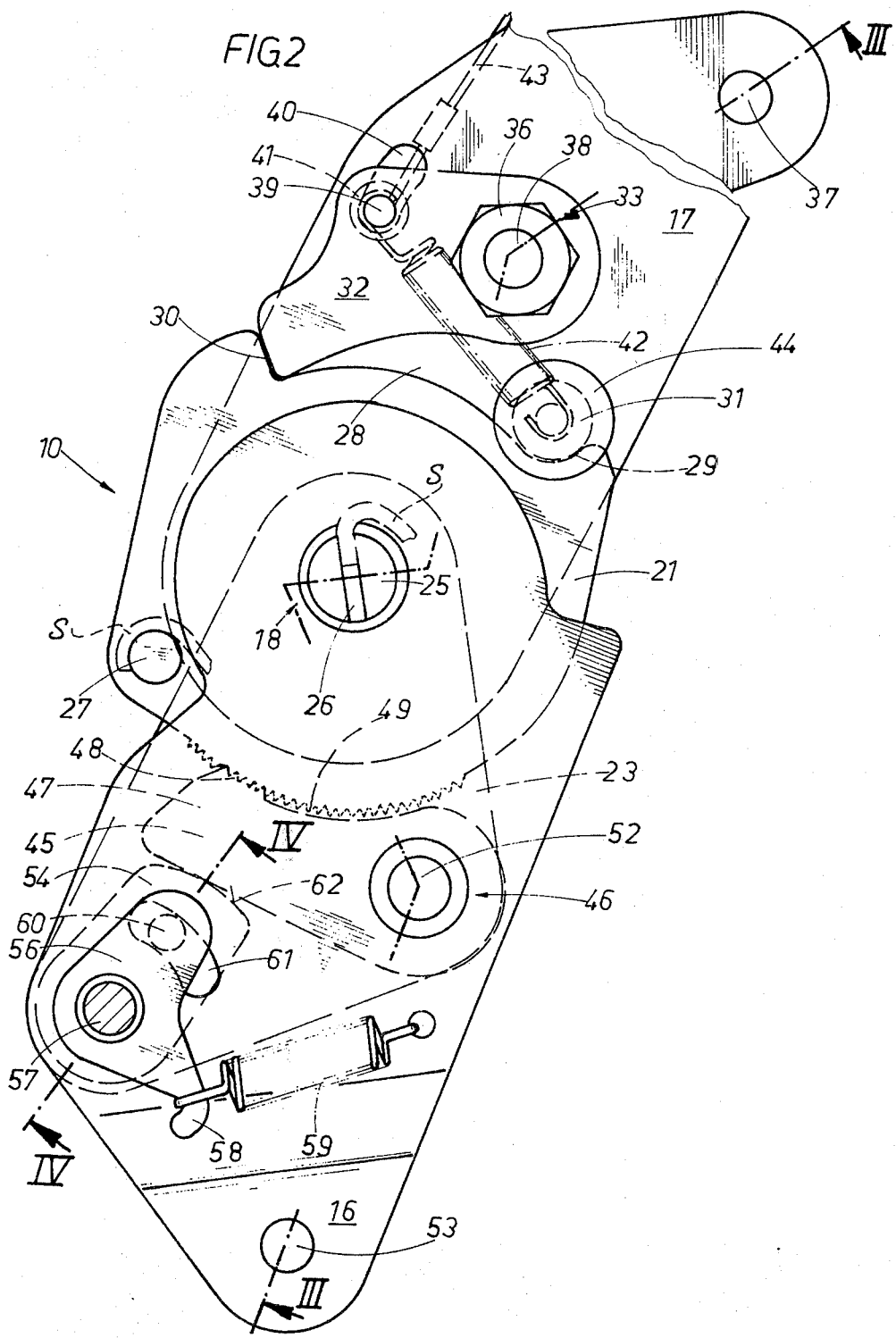
FIG. 2 is a side view illustrating the hinge fitting in detail.

As FIG. 2 shows, the upper portion of the circumference of the member 21 is formed with a part-circumferentially extending marginal recess 28, the right-hand side of which (in FIG. 2) is bounded by a shoulder 29 and the left-hand side of which is bounded by an abutment face 30. A pin 31 projects from the member 17 and cooperates with the shoulder 29, and a pawl 32 cooperates with the abutment surface 30. The pawl is turnably mounted on a boss 33 of the member 17. The boss 33 is hollow and of tubular construction, having a longitudinal portion 34 that is mounted in the member 17 by riveting, a further portion 35 on which the pawl 32 is turnably mounted, and a head 36 which advantageously may be of hexagonal outline. The portion 35 is advantageously eccentrically offset relative to the portion 34 i.e. its longitudinal center line is transversely spaced from the longitudinal center line of portion 34, in order to permit, by turning of the boss 33, to obtain an engagement of the pawl 32 with the abutment surface 30 which is almost free of play. In such a construction, the tolerances to which the parts in question must be manufactured need not be very precise. The free end portion of the member 17 is formed with a cutout 37 through which a screw is threaded to connect the member 17 to the backrest portion 12. A similar screw extends through the hollow center 38 of the boss 33 into the backrest portion 12.

The pawl 32 is provided with a projection 39 which extends through an arcuately curved cutout 40 of the member 17 and engages with an abutment portion 41 that lateral side of the member 17 that faces away from the pawl 32. A part of the projection 39 which extends beyond the portion 41 is engaged by a motion-transmitting element, shown as a helical spring 42 which acts upon the pawl 32 in a sense urging the same into engaging position; furthermore, the same portion of the projection 39 is engaged by a linkage 43 which establishes a connection with the member 15. The spring 42 has its other end connected to the projection 31 which carries a portion 44 (see FIG. 2) that overlaps the edge of the member 21.

A pawl 45 is mounted on the member 16 beneath the member 23, turnable about a tubular boss 46 whose head 47 is formed with a series of teeth 48 which cooperate with teeth 49 formed on the periphery of the member 21, in order to releasably arrest the same in a desired relative angular orientation of the backrest member 12 with reference to the member 16 and hence the seat member 11. The boss 46 has a portion 50 which is riveted to the member 16 and an axially successive portion 51 on which the pawl 45 is turnably mounted. The pawl 45 is retained against axial movement by the presence of the member 23 which is connected with the free end of the boss 46 by riveting. The center passage of the boss 46 is identified with reference numeral 52 and again a screw or the like extends through the passage 52 to connect the member 16 to the seat portion 11. A further screw, rivet or the like extends through a cutout 53 in the member 16 and also into the seat portion 11.

A cam 54 holds the pawl 45 in the operative position; the cam 54 is mounted on an end portion of a pin 55 which extends through the member 16 and the member 23; the other end portion of the pin 55 turnably journals a shaft 57 which couples the member 14 with a member 56, a portion 58 of which serves to support a spring 59 the other end of which is connected to the member 16. Further, the member 56 is provided with a pin 60 which extends through an arcuately curved cutout 61 which extends circumferentially of the pin 55 and engages the cam 54. The pin 60 couples the member 56 nonrotatably with the cam 54. The latter is formed with an eccentrically curved contact face 62 that is eccentric relative to the axis of rotation and serves to hold the pawl 45 in engaged position.

When the member 14 is turned in clockwise direction in FIG. 1, the pawl 54 is moved against the attention of the spring 59 to a release position in which the pawl 45 moves out of engagement so that the backrest portion 12 with the member 21 that is coupled to it via the pin 31 and the pawl 32 can be pivoted to a selected angular position relative to member 16. The flat spiral spring S permits the backrest portion to follow the pressure exerted by the back of a user who is seated on the seat portion 11. The member 15 is used to disengage the pawl via the pin 39, so that the backrest portion 12 can be tilted in counterclockwise direction with the member 17. After the backrest portion 12 has been moved upright again, the pawl 32 is automatically urged by the spring 42 into the arresting position shown in FIG. 2, in which it arrests the member 17 and the backrest member 12 relative to the member 21, which in turn has the previously selected angular position relative to the member 16.

By providing the bosses 33 and 46 in accordance with the present invention as tubular bosses that are formed on the members 16, 17, the present invention makes it possible to use them to accommodate mounting members such as screws or the like which mount the members 16 and 17 on the associated members of the seat. This makes possible a particularly small dimensioning of the members 16 and 17 and thus overcomes one of the disadvantages of the prior art. In addition, the members 16 and 17 are largely relieved of stresses acting upon them when the seat back is tilted upwardly or downwardly, because the forces are transmitted directly to the pawls 32, 45, rather than being transmitted via the members 16, 17.

Of course, various modifications may be made in the illustrated embodiment which has been shown purely for purposes of example and explanation. Thus, it would be possible to use other journal pins or bosses of the arrangement for the purpose of having screws or other fastening devices extend through them, by making them hollow as is the case in the bosses described herebefore.

It will be understood that each of the elements described above, or two or more together, may also find a useful application in other types of constructions differing from the types described above.

While the invention has been illustrated and described as embodied in a hinge fitting for vehicle seats, it is not intended to be limited to the details shown since various modifications and structural changes may be made without departing in any way from the spirit of the present invention.

Without further analysis, the foregoing will so fully reveal the gist of the present invention that others can by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A hinge fitting for vehicle seats having a tiltable backrest member, comprising a first hinge member connectable to a seat rest member; a second hinge member connectable to a backrest member; pivot means connecting said hinge members for relative pivoting movement; arresting means for arresting said hinge members in selected relative angular positions including a tubular boss on at least one of said hinge members and a pawl journalled on said boss for turning movement about the same; and connecting means extending through said boss and connecting said one hinge member to the associated seat member or backrest member.

2. A hinge fitting as defined in claim 1, wherein said arresting means further comprises an additional hollow boss on the other of said hinge members, and an additional pawl journalled on said additional boss; and wherein said connecting means also extends through said additional hollow boss and connects said other hinge member to the associated backrest member or seat member.

3. A hinge fitting as defined in claim 1, said one hinge member having a cutout; and said pawl comprising a projection extending through said cutout and provided with an abutment which engages an edge bounding said cutout.

4. A hinge fitting as defined in claim 3, said projection having a part projecting beyond said cutout and engageable by a motion-transmitting element.

5. A hinge fitting as defined in claim 4, wherein said element is a spring.

6. A hinge fitting as defined in claim 4, wherein said element is a linkage.

7. A hinge fitting as defined in claim 3, wherein said abutment is a shoulder.

* * * * *